United States Patent
Almumen et al.

(10) Patent No.: US 11,442,908 B2
(45) Date of Patent: Sep. 13, 2022

(54) OPTIMIZED DATABASE MIGRATION FOR LARGE SYSTEMS BETWEEN PLATFORMS WITH DIFFERENT ENDIANNESS

(71) Applicant: Saudi Arabian Oil Company, Dhahran (SA)

(72) Inventors: Mohammad Jawad A Almumen, Dammam (SA); Alaa Mohammed G Zarban, Dhahran (SA); Amro Farouk Alsagga, Dhahran (SA); Mustafa Salman Alghafli, Dhahran (SA); Marwan Ahmad S Almuhaiteeb, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 165 days.

(21) Appl. No.: 16/872,196

(22) Filed: May 11, 2020

(65) Prior Publication Data
US 2021/0349864 A1    Nov. 11, 2021

(51) Int. Cl.
*G06F 16/00*    (2019.01)
*G06F 16/21*    (2019.01)
(Continued)

(52) U.S. Cl.
CPC ........ *G06F 16/214* (2019.01); *G06F 11/1464* (2013.01); *G06F 11/1469* (2013.01);
(Continued)

(58) Field of Classification Search
CPC .............. G06F 16/214; G06F 11/1464; G06F 11/1469; G06F 16/128; G06F 16/1734;
(Continued)

(56) References Cited

U.S. PATENT DOCUMENTS

2004/0139129 A1    7/2004    Okuyama et al.
2011/0178870 A1    7/2011    Ravichandran et al.
(Continued)

OTHER PUBLICATIONS

IBM, Catalog statistics, retrieved on Jan. 15, 2022, retrieved from the Internet <URL: https://www.ibm.com/docs/en/db2/11.5?topic=optimization-catalog-statistics> (Year: 2019).*
(Continued)

*Primary Examiner* — Tyler J Torgrimson
(74) *Attorney, Agent, or Firm* — Fish & Richardson P.C.

(57) ABSTRACT

The disclosure describes a method for database migration including: identifying, during an uptime of a source database system, one or more increments between a back-up copy of the source database system and the source database system, the source database system comprising: one or more datafiles encoding data objects, and tablespace data encoding table/index data, restoring, in parallel and during the uptime of the source database system, the one or more datafiles from the back-up copy to a target database system that uses a different endian format; in response to determining that a downtime for the source database system has arrived, sequentially performing, during a downtime of the source database system: setting the tablespace data to read only; recovering datafiles on the target database system in accordance with the one or more increments; and setting the tablespace data to read and write; and activating the target database system to go live.

14 Claims, 7 Drawing Sheets

550

Identifying one or more increments between a back-up copy of the source database system and the source database system 552

↓

Restoring, in parallel and during the uptime of the source database system, the one or more datafiles from the back-up copy to a target database system 554

↓

Sequentially performing, during the downtime of the source database system, (i) setting the tablespace data to read only; (ii) recovering datafiles on the target database system in accordance with the one or more increments; and (iii) setting the tablespace data to read and write 556

↓

Activating the target database system to go live 558

(51) Int. Cl.
    *G06F 16/22*        (2019.01)
    *G06F 16/17*        (2019.01)
    *G06F 16/11*        (2019.01)
    *G06F 11/14*        (2006.01)

(52) U.S. Cl.
    CPC ........ *G06F 16/128* (2019.01); *G06F 16/1734* (2019.01); *G06F 16/211* (2019.01); *G06F 16/2282* (2019.01); *G06F 2201/80* (2013.01)

(58) Field of Classification Search
    CPC . G06F 16/211; G06F 16/2282; G06F 2201/80
    See application file for complete search history.

(56) References Cited

U.S. PATENT DOCUMENTS

| | | | |
|---|---|---|---|
| 2011/0179103 | A1 | 7/2011 | Ravichandran et al. |
| 2014/0215033 | A1 | 7/2014 | Ravichandran et al. |
| 2015/0016320 | A1 | 1/2015 | Pelletier et al. |
| 2018/0137113 | A1* | 5/2018 | Kurz ..................... G06F 16/214 |
| 2018/0336103 | A1* | 11/2018 | Sekar .................. G06F 11/1451 |
| 2019/0018742 | A1 | 1/2019 | Thomsen et al. |
| 2019/0222560 | A1 | 7/2019 | Ford et al. |
| 2019/0311040 | A1 | 10/2019 | Nayak et al. |
| 2019/0354407 | A1 | 11/2019 | Booss et al. |

OTHER PUBLICATIONS

Sindol, SQL Server Row Count for all Tables in a Database, MSSQL Tips, archived Dec. 10, 2018, retrieved on Jan. 15, 2022, retrieved from the Internet <URL: https://web.archive.org/web/20181210121147/https://www.mssqltips.com/sqlservertip/2537/sql-server-row-count-for-all-tables-in-a-database/> (Year: 2014).* blogs.sap.com [online], "Zero downtime option of SUM (ZDO) is 'available on request,'" Feb. 2016, retrieved on Jun. 23, 2020, retrieved from URL <https://blogs.sap.com/2016/02/25/zero-downtime-option-of-sum-zdo-is-available-on-request/>, 11 pages.

blogs.sap.com [online], Herman, "Minimize your downtime of an update," Mar. 2015, retrieved on Jun. 23, 2020, retrieved from URL <https://blogs.sap.com/2015/03/11/minimize-your-downtime-of-an-update/>, 7 pages.

launchpad.support.sap.com [online], "1035051—Transportable tablespaces," Sep. 2011, retrieved on Jun. 28, 2020, retrieved from URL <https://launchpad.support.sap.com/#/notes/1035051>, 10 pages.

launchpad.support.sap.com [online], "2620180—NZDT—Composite SAP Note—DMIS 2011," 2011, retrieved on Jun. 28, 2020, retrieved from URL <https://launchpad.support.sap.com/#/notes/2620180_>, 17 pages.

sap.com [online], "Overview—System Copy and Migration with Software Provisioning Manager 1.0," Sep. 2017, retrieved on Jun. 23, 2020, retrieved from URL <https://www.sap.com/documents/2015/07/c239f2c0-5b7c-0010-82c7-eda71af511fa.html>, 8 pages.

Support.sap.com [online], "SAP Software Provisioning Manager," retrieved on Jun. 23, 2020, retrieved from URL <https://support.sap.com/en/tools/software-logistics-tools/software-provisioning-manager.html>, 3 pages.

PCT International Search Report and Written Opinion in International Appln. No. PCT/US2021/031586, dated Jul. 23, 2021, 16 pages.

* cited by examiner

550

Identifying one or more increments between a back-up copy of the source database system and the source database system 552

Restoring, in parallel and during the uptime of the source database system, the one or more datafiles from the back-up copy to a target database system 554

Sequentially performing, during the downtime of the source database system, (i) setting the tablespace data to read only; (ii) recovering datafiles on the target database system in accordance with the one or more increments; and (iii) setting the tablespace data to read and write 556

Activating the target database system to go live 558

FIG. 5B

OPTIMIZED DATABASE MIGRATION FOR LARGE SYSTEMS BETWEEN PLATFORMS WITH DIFFERENT ENDIANNESS

TECHNICAL FIELD

This disclosure generally relates to migration of a large database (e.g., a large Oracle database) between platforms of different Endian formats.

BACKGROUND

Database platforms can incorporate a big-endian system or a little-endian system, depending on processor architecture.

SUMMARY

In one aspect, the present disclosure describes a computer-implemented method for database migration, the method including: identifying, during an uptime of a source database system, one or more increments between a back-up copy of the source database system and the source database system, wherein: the source database system comprises: one or more datafiles encoding data objects, and tablespace data encoding table/index data, and the back-up copy of the source database system comprises: the one or more datafiles encoding data objects; restoring, in parallel and during the uptime of the source database system, the one or more datafiles from the back-up copy to a target database system, the target database system using an endian format different from the source database system; in response to determining that a downtime for the source database system has arrived, sequentially performing, during the downtime of the source database system, (i) setting the tablespace data to read only; (ii) recovering datafiles on the target database system in accordance with the one or more increments; and (iii) setting the tablespace data to read and write; and activating the target database system to go live.

Implementations may include one or more of the following features.

The method may further include: identifying, during the uptime of the source database system, a portion of the tablespace data that is unused by the source database system; and exporting, during the uptime of the source database system, the portion of the tablespace data that is unused by the source database system. The method may further include: importing, to the target database system and after the target database system has gone live, the portion of the tablespace data that is unused by the source database system.

The method may further include: backing up, during the uptime of the source database system, user data of the source database system, the user data encoding users, and respective roles, credentials, and assignments of the users. The method may further include: restoring, during the downtime of the source database system, the user data of the source database system.

The method may further include: transferring, during the downtime of the source database system, one or more non-table/index database objects from the source database system to the target database system. The one or more non-table/index database objects may include at least one of: a sequence, or a procedure of the source database system.

The method may further include: exporting a snapshot of database statistics of the source database system during the uptime of the source database system. The method may further include: importing, to the target database system and after the target database system has gone live, the snapshot of database statistics of the source database system.

The method may further include: creating a first row count table for the source database system and a second row count table for the target database system; comparing the first row count table and the second row count table; and determining an integrity of migrating the source database system to the target database system.

In another aspect, the present disclosure describes a computer system for data migration from a source database system to a target database system, the computer system comprising one or more processors configured to perform operations of: identifying, during an uptime of a source database system, one or more increments between a back-up copy of the source database system and the source database system, wherein: the source database system comprises: one or more datafiles encoding data objects, and tablespace data encoding table/index data, and the back-up copy of the source database system comprises: the one or more datafiles encoding data objects; restoring, in parallel and during the uptime of the source database system, the one or more datafiles from the back-up copy to a target database system, the target database system using an endian format different from the source database system; in response to determining that a downtime for the source database system has arrived, sequentially performing, during the downtime of the source database system, (i) setting the tablespace data to read only; (ii) recovering datafiles on the target database system in accordance with the one or more increments; and (iii) setting the tablespace data to read and write; and activating the target database system to go live.

Implementations may include one or more of the following features.

The operations may further comprise: identifying, during the uptime of the source database system, a portion of the tablespace data that is unused by the source database system; and exporting, during the uptime of the source database system, the portion of the tablespace data that is unused by the source database system. The operations may further comprise: importing, to the target database system and after the target database system has gone live, the portion of the tablespace data that is unused by the source database system.

The operations may further comprise: backing up, during the uptime of the source database system, user data of the source database system, the user data encoding users, and respective roles, credentials, and assignments of the users. The operations may further comprise: restoring, during the downtime of the source database system, the user data of the source database system.

The operations may further comprise: transferring, during the downtime of the source database system, one or more non-table/index database objects from the source database system to the target database system. The one or more non-table/index database objects comprises at least one of: a sequence, or a procedure of the source database system.

The operations may further comprise: exporting a snapshot of database statistics of the source database system during the uptime of the source database system. The operations may further comprise: importing, to the target database system and after the target database system has gone live, the snapshot of database statistics of the source database system.

The operations further comprise: creating a first row count table for the source database system and a second row count table for the target database system; comparing the first row count table and the second row count table; and determining an integrity of migrating the source database system to the target database system.

Implementations according to the present disclosure may be realized in computer implemented methods, hardware computing systems, and tangible computer readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The details of one or more implementations of the subject matter of this specification are set forth in the description, the claims, and the accompanying drawings. Other features, aspects, and advantages of the subject matter will become apparent from the description, the claims, and the accompanying drawings.

DESCRIPTION OF DRAWINGS

FIG. 5B illustrates an example of a flow-chart diagram according to an implementation of the present disclosure.

Like reference numbers and designations in the various drawings indicate like elements.

DETAILED DESCRIPTION

The disclosed technology is directed to migration of a large database (e.g., a large Oracle database) between platforms of different endian formats. For context, database platforms can be a big-endian system or a little-endian system, depending on processor architecture. When migrating a large database across different endian systems, a myriad of challenges may arise, ranging from system complexity to system down time, and system scalability. The disclosed technology addresses the challenges inherent or unique for migrating larger databases. In particular, various implementations may not require additional hardware, software, or special consulting services. The advantages include a short downtime less likely impacted by the size of the database. The technology further includes error checking mechanism to preserve data integrity during the migration.

In more detail, the technology allows moving unused tables and indexes to a separate tablespace to migrate during uptime. For example, some implementations may move the unused objects outside the tablespaces that will be migrated, and then, after the downtime has passed, export and import the unused objects separately during uptime. This distinct separation can reduce the downtime caused by the database migration process. Some implementations may use parallel restore of data file to further reduce downtime during migration. For example, the processes to backup and restore of the data files can be parallelized at the OS level. As a result, this will reduce the restore time significantly. This parallelization process can set the parallelism up to computing resources assigned to the server. In one instance, restoring data files is split into various threads across different OS platforms for simultaneous execution. Some implementations allow migration of database users and roles in which the migration back up all the database users, their roles, their privileges, and their assignments and restore such information in the target database to maintain system integrity. Some implementations allow migration of database objects by migrating non-table/index database objects, such as sequences and procedures, which can be used to maintain system integrity. Implementations may further schedule the migration of database table statistics to system uptime to further reduce system downtime.

Figure 1:
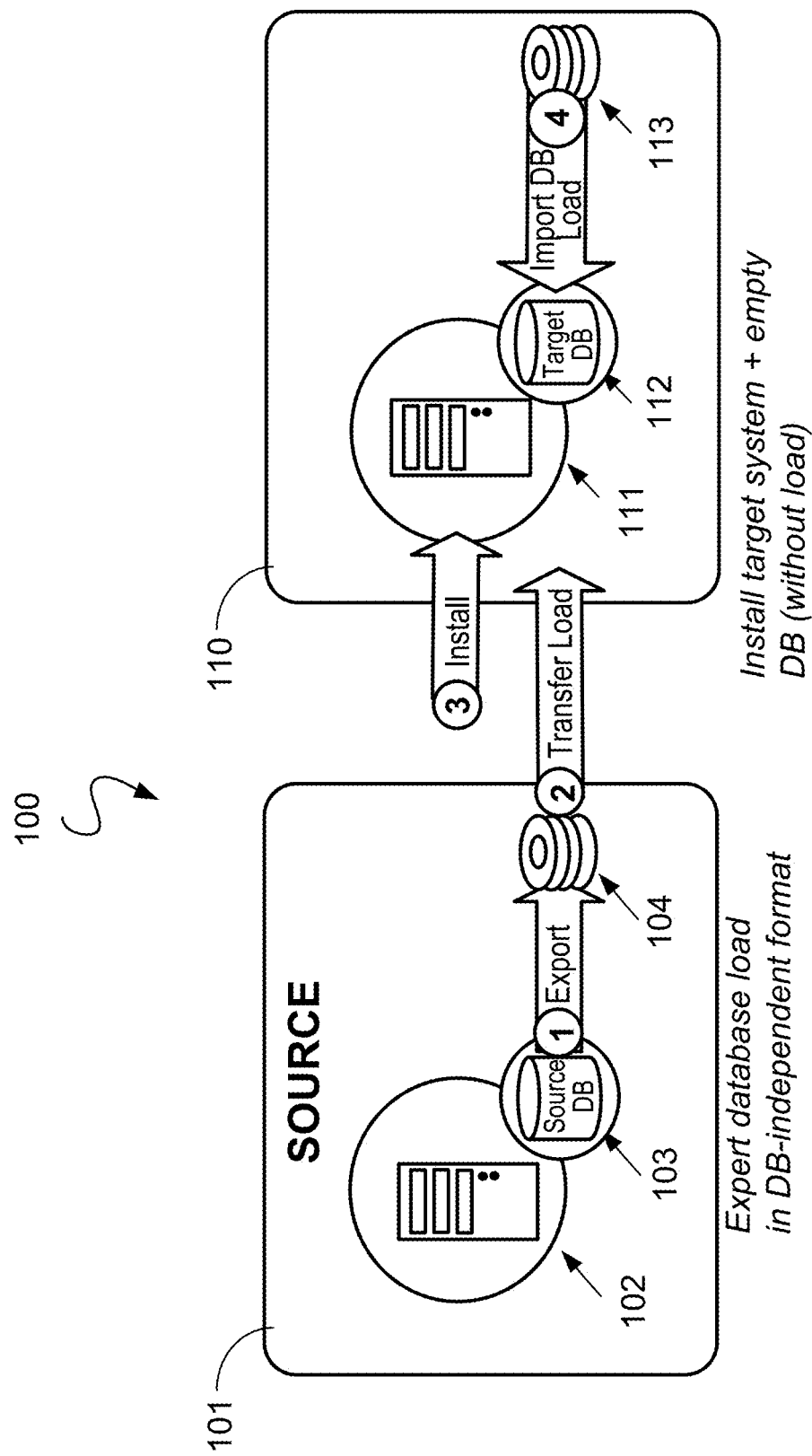
FIG. 1 illustrates an example of a database migration process according to an implementation of the present disclosure.

When migrating from a first system to a second system, a backup and restore method is often considered. To illustrate, a system administrator may perform a system copy to create test-demo-training systems. When the migration involves changing an operating system and/or database, a system administrator may perform a migration of a large database (e.g., SAP) system copy and migration services in order to create consistent copies of the SAP systems or a system on a combination of operating system/database. Here, a SAP system stands for Systems Applications and Products in Data Processing, which can implement ERP (Enterprise Resource Planning) database. As illustrated in FIG. 1, ax example 100 of a migration process can transfer a database system from source system 101 to a target system 110. Source system 100 includes server 102 and source database (DB) 103 residing on server 102. Likewise, target system 110 includes server 111 and target database (DB) 112 residing on server 111. Both server 102 and server 111 can run a variety of operating systems on a number of processor architectures. Both source database 103 and target database 112 can include, for example, an Oracle system, a MySQL system, a PostgreSQL system, or an Apache Derby system. The database may not be limited to a relational database.

By way of example, an SAP system can run an Oracle database. In this example, for system migration, a system administrator can make an online backup of the source database without having to shut down the SAP system, which means there is no downtime of the source system involved. Indeed, the system administrator can copy the backup file to the target system, restore the backup file to a new database on the target system, then install a system manager on the target server to complete the copy/install. This approach may work when cloning a system for test purposes. However, if the goal is to migrate the existing production system to new hardware with different CPU architecture and different endianness, then downtime may be inevitable because changes cannot be made to the source system after the backup file is created.

However, this method will restore the data using the source endianness format which will not work on the destination database.

As illustrated in FIG. 1, the database migration can include export the database load in DB-independent format from source database (DB) 103 to storage 104 (step 1). Storage 104 can then be transferred to target system 110 as storage 113. This transfer can be an online transfer, without necessitating a physical delivery of hardware storage at the target system 110. From storage 113, the load is imported into target database (DB) 112. Such export/import method involves shutting down the source system 101, then using a software manager to export the data to create an export image, and then using the software manager again on the target system 110 to install SAP with the export image as a source. Notably, the export image will likely be hundreds of files, but will also be considerably smaller than the original database. When the downtime extends on the source system 101, the migration process can become more complex. The drawbacks of this approach is that migration downtime is proportional to the size of database being migrated. Thus, migrating, for example, a 1 TB database using this approach will result in prolonged business outage because the export/import method assumes no changes can be made to the source database during the migration process. For context, the software manager provides the ability to check for data integrity between source and target to guard against inconsistencies during the migration process.

Figure 2A:
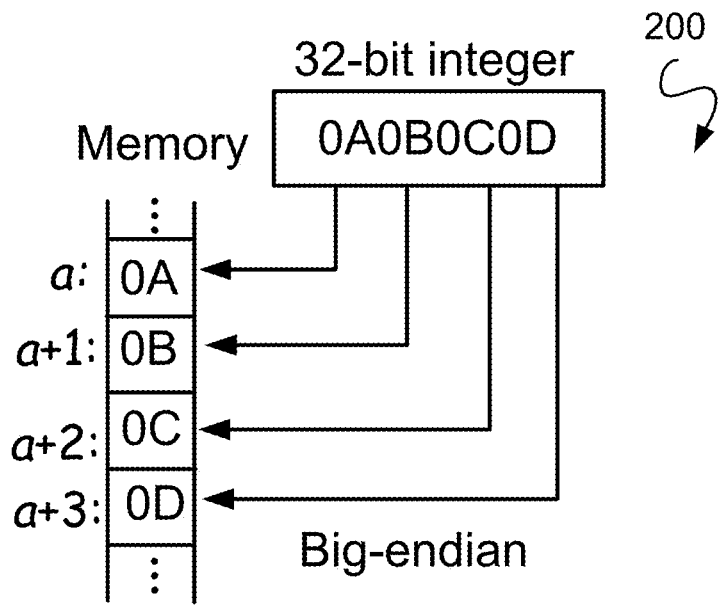
FIGS. 2A to 2B illustrate examples of big-endian and little-endian arrangements according to an implementation of the present disclosure.
Figure 2B:
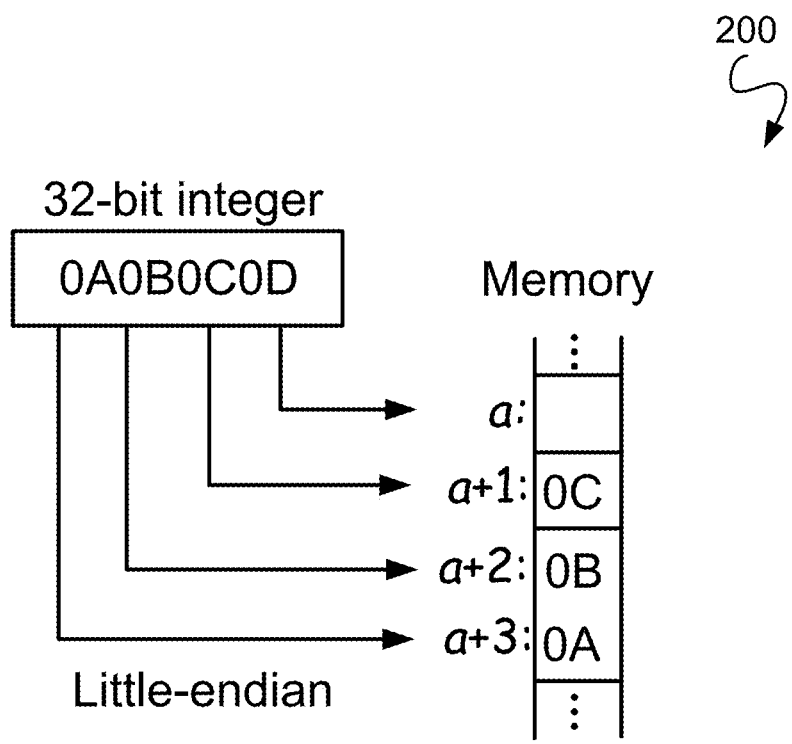

Referring to FIGS. 2A and 2B, the big-endian and little-endian arrangements are explained. Endianness is the sequential order in a list of arbitrary objects. A little-endian ordering always places the least-significant element in the lowest-enumerated ("smallest numbered" or "first") position. A big-endian ordering places the least-significant element in the largest-enumerated ("largest numbered" or "last") position. A mixed-endian ordering can place elements not in order of significance completely, from start to finish. In order to exclude any form of mixed endianness, the positions of all elements need to be defined. Little-endian and big-endian are the reverse of each other. In computer science, endianness usually refers to the ordering of packing bytes into words when stored in memory. Endianness can also describe the ordering of bits packed into larger words, especially with respect to the order of bits transmitted over a serial data link.

FIG. 2A is an explanatory diagram of the big-endian format. For example, when storing a 4 byte data 0A0B0C0D (hexadecimal, hereinafter, the same for all within marks) into the memory areas addressed to a+3 in the big-endian format, the data is stored as '0A, 0B, 0C, 0D', sequentially, in the addresses a, a+1, a+2, a+3, and a+4.

FIG. 2B shows the same example, except by saving the data in reverse order. In this example, storing the same 4 byte data 0A0B0C0D into the memory areas is addressed in the little-endian format. The data is stored as '0D, 0C, 0B, 0A', sequentially, in the addresses a, a+1, a+2, a+3, and a+4.

According to the big-endian format, when addressing memory or sending/storing words in byte order, the most significant byte—the byte containing the most significant bit—is stored first (has the lowest address) or sent first, then the following bytes are stored or sent in decreasing significance order, with the least significant byte the one containing the least significant bit stored last (having the highest address) or sent last.

In comparison, the little-endian format reverses the above order: the sequence addresses, sends, or stores the least significant byte first (lowest address) and the most significant byte last (highest address).

Depending on the underlying processor architecture, a computer system generally use one of the above formats for all the data. In other words, the underlying processor architecture generally determines the computer system's native format. However, when reading memory or receiving transmitted data from a different computer system, it may become necessary to process and translate data between the native endianness format and a different format.

The order of bits within a byte or word can also have endianness (as discussed later); however, a byte is typically handled as a single numerical value or character symbol and so bit sequence order is obviated.

Figure 3:
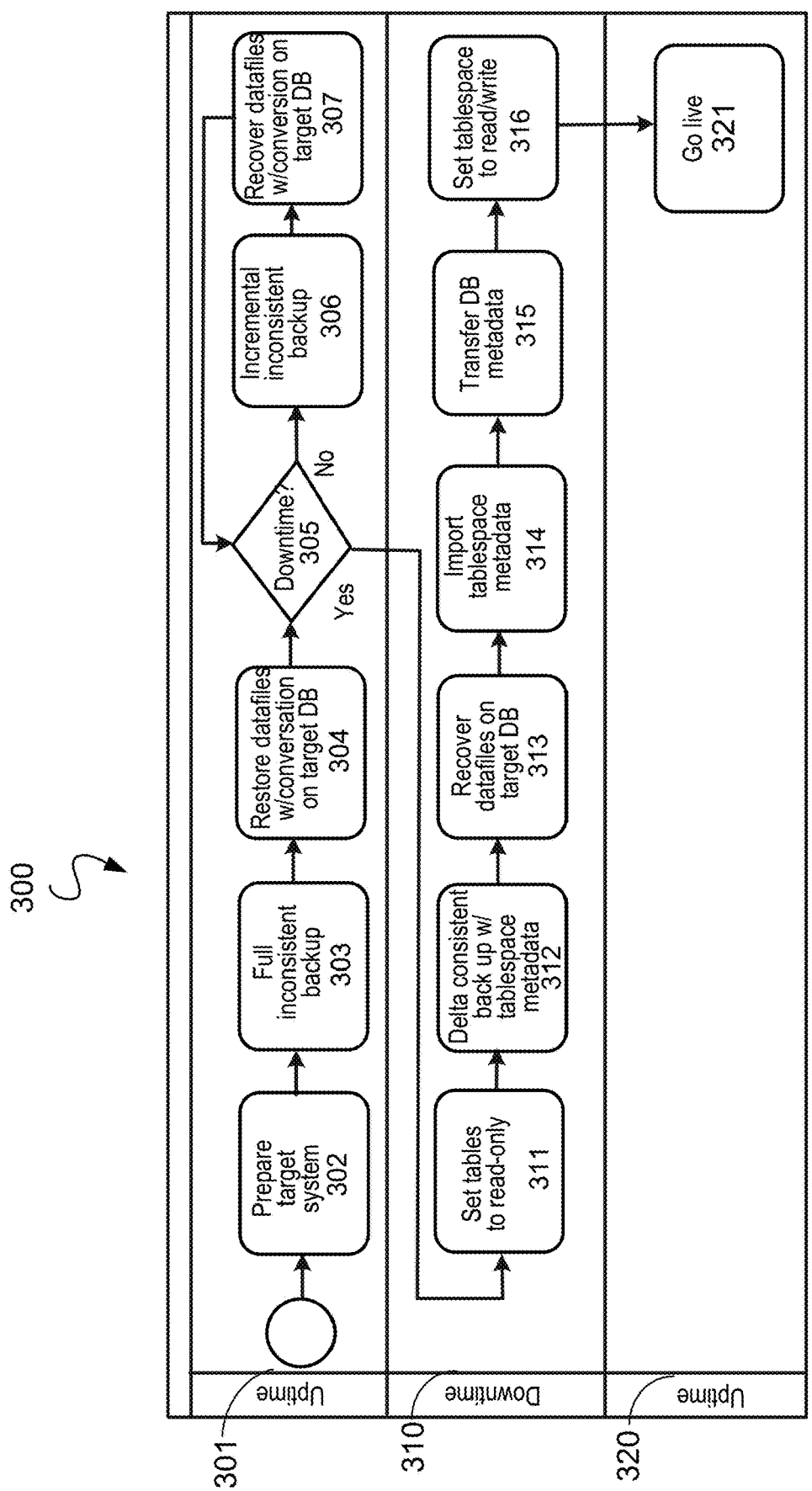
FIG. 3 illustrates an example of a database migration diagram according to an implementation of the present disclosure.

FIG. 3 is a flow chart 300 illustration some implementations that allow transporting data files, tablespaces, or an entire database across platforms. These implementations may only transport data files and tablespaces across platforms with different endian format. In some instances, transportable tablespaces is an Oracle feature that uses a software manager, to move a set of tablespaces from one Oracle database to another. However, these instances may not allow the transport of system level tablespaces (e.g., SYSTEM and SYSAUX) that contain the metadata of the database, which may necessitate moving this metadata using a different export and import method.

As illustrated, panel 301 indicates uptime, panel 310 indicates downtime, and panel 320 indicates uptime. The process may start from preparing the target system (302). This can include disk partitioning, installation of a duplicate operating system with comparable device drivers for the hard disk storage (or non-volatile storage), and installation of a duplicate of the database software itself. The process may then perform a full backup (303) of all inconsistencies of the file system on which the source database system resides. This inconsistency backup applies to all inconsistencies, for example, incremental changes since the last full system backup. The process may then restore the datafiles from the last full system backup to the target database system (304). The restore can include a conversion from one endian format to another. The process may then determine whether the downtime has arrived (305), One example is whether an incremental change is pending. In other cases, the downtime may be scheduled, or initiated by a system administrator. If downtime has not arrived, the process may, for example, continue with an incremental backup (306). This backup may apply to the datafiles and the database system itself. Thereafter, the process may recover datafiles, for example, with endian conversion on the target database system (307) so that the incremental changes are applied on the target database system. At this time, the process may again probe whether the downtime has arrived.

If downtime has arrived, the source database system may enter downtime and the process may proceed to set all tablespaces to read only (so that no update to the datafiles of the source database system can proceed) (311). Thereafter, the process may perform a delta consistent backup with table space metadata (312) so that incremental changes to the metadata can be transferred to the target database system. Then, the process may recover datafiles on the target database system, for example, in accordance with the metadata (313). The process may then import tablespace metadata (314) and transfer database metadata (315). When dust is settled, the process may set tablespace to read/write (316) so that the target database can go live (321). When the cloning is completed, the migration process may terminate.

In essence, some implementations can use incremental backups during uptime, and then backup and restore only the delta data during downtime. This scheduling can significantly reduce the downtime for large databases during system migration. However, some implementations may not maintain database users, roles/privileges, and their assignments from the source database. Additionally, some implementations may still see increases in the downtime because the export/import of metadata can proportionally depend on the size of the statistics and the number of database objects.

Figure 4:
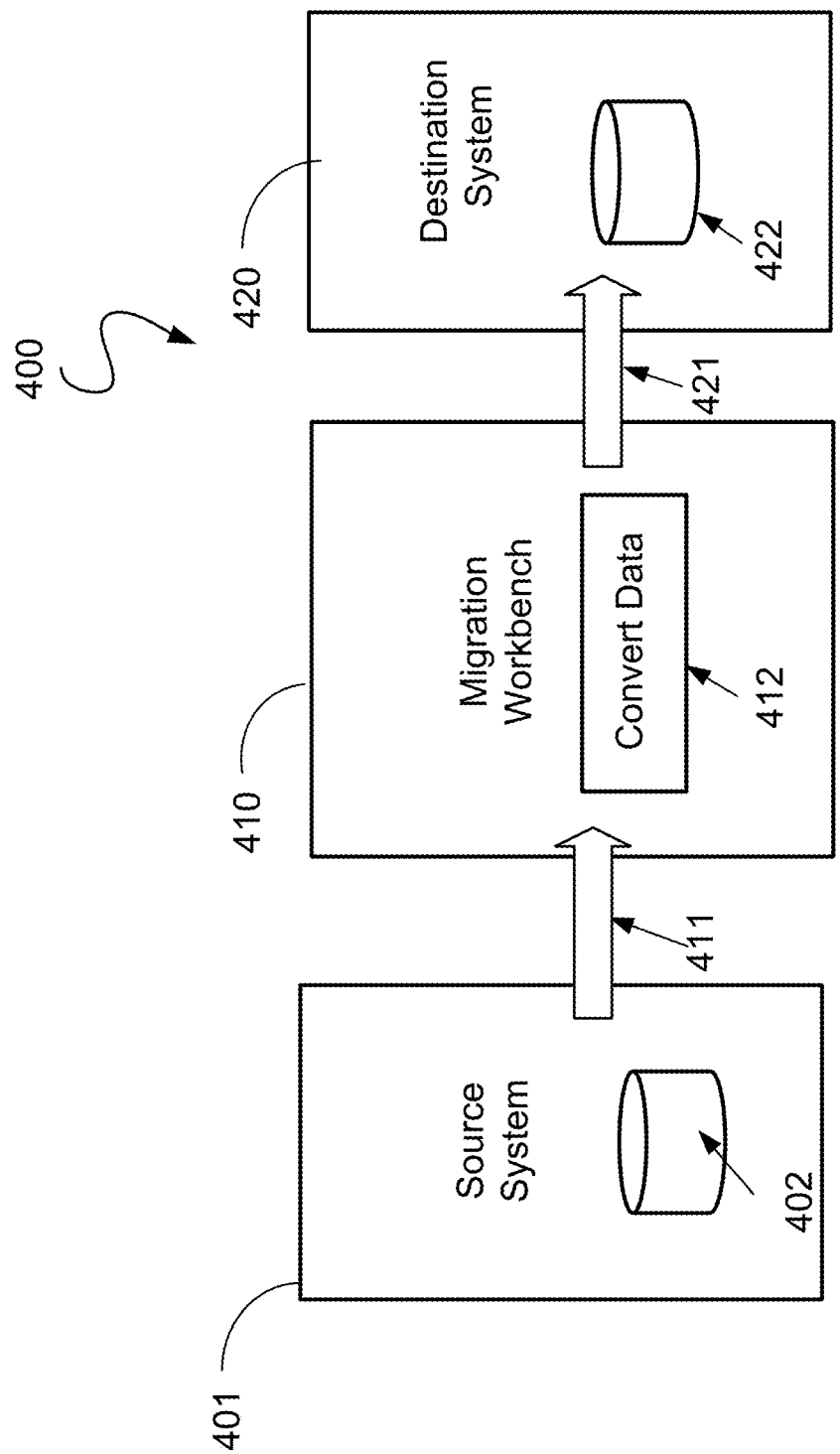
FIG. 4 illustrate another example of a database migration diagram according to an implementation of the present disclosure.

Some implementations may further reduce the downtime to near-zero, as illustrated in FIG. 4 illustrates another example 400 of a database migration diagram. Source system 400 hosts source database system 401 while the target database system 422 is hosted by destination system 420. The migration workbench 410 may utilize a database trigger based record and replay to record transactional data in the source system 410 and uses a clone of the production system (e.g., destination system 422) where the maintenance events can be carried out. The migration workbench 410 may additionally include an engine 412 to convert data, as recorded, before replaying the changes. Changes in the production system can be recorded via the trigger mechanism (411) and then replayed (421) to the final target system. The vast majority of all delta changes can be replayed online. For the remaining small percentage of the delta changes are then replayed in the downtime to bring the target system back up to date. Such implementations may necessitate additional hardware resources and additional effort on the customer side to deliver the project. While these implementations may reduce or minimize downtime, which reduction may not scale up with database size, these implementations tend to impose high cost of service in terms of both software and hardware maintenance and upkeep.

Figure 5A:
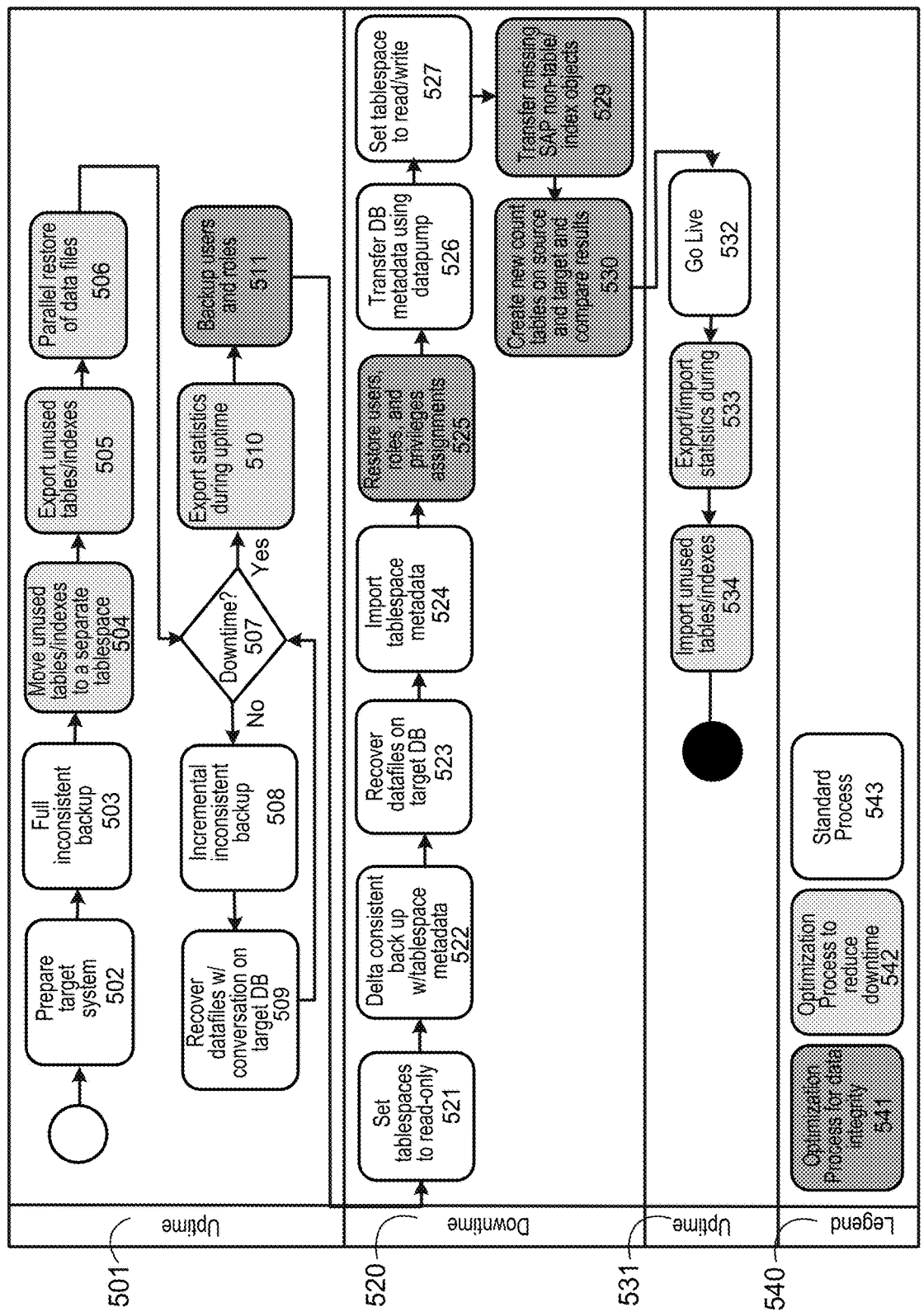
FIG. 5A illustrates yet another example of a workflow diagram according to an implementation of the present disclosure.

FIG. 5A is a flow diagram 500 illustrating yet another example of a workflow diagram according to an implementation of the present disclosure. Panel 501 indicates system uptime. Panel 520 indicates system downtime. Panel 531 indicates system uptime again. Panel 540 shows legends for optimization process for data integrity (541), optimization process to reduce downtime (542), and standard process (543). The process may start from preparing the target system (502). This can include disk partitioning, installation of a duplicate operating system with comparable device drivers for the hard disk storage (or non-volatile storage), and installation of a duplicate of the database software itself. The process may then perform a full backup (503) of all inconsistencies of the file system on which the source database system resides. This inconsistency backup applies to all inconsistencies, for example, incremental changes since the last full system backup.

Next, the process may move unused tables/indices to a separate tablespace (504). Tables/Indices are determined unused if the table or index contains zero records, excluding temporary tables. The unused tables/indices are moved to a separate new tablespaces that can be migrated to the target database during uptime without impacting the downtime. To illustrate, the downtime step of database metadata transfer is proportional to the number of tables and indexes. Thus, moving these unused objects outside the tablespaces that will be migrated during downtime, and then exporting the unused tables/indices (505) for later importation during uptime, can reduce the duration of downtime when migration large databases, for example, database 1 TB and larger. Thereafter, the process may identify each datafile for restoration so each datafile can be restored individually and in parallel (506), as opposed to a backup/restore of a set of datafiles. Armed with the ability for individual restoration, the process can control the level of parallelism by, for example, launching a concomitant number of restore commands in parallel while sorting out the dependency of each datafile. For example, the parallel execution of multiple threads can be performed at the operating system level. In other words, the process may utilize the filesystem functionality of the underlying operating system to initially schedule threads for restoring datafiles on which other datafiles may depend before scheduling threads for restoring the remaining data files. As a result, the backups and restorations of the datafiles to parallelize the process can be optizmied at the OS level, which can significantly reduce the restore time. This parallelization process can thus set the parallelism up to computing resources assigned to the server hosting the source database system and the server hosting the target database system.

The process may then determine whether the downtime has arrived (507). One example is whether an incremental change is pending. In other cases, the downtime may be scheduled, or initiated by a system administrator. If downtime has not arrived, the process may, for example, continue with an incremental backup (508). This backup may apply to the datafiles and the database system itself. Thereafter, the process may recover datafiles, for example, with endian conversion on the target database system (509) so that the incremental changes are applied on the target database system. At this time, the process may again probe whether the downtime has arrived.

If the process determines to enter downtime, the process may, during this uptime, export the database statistics profiling the performance of the source database system (510) and then back-up user information such as users and their respective roles, credentials and assignments (511). The source database system may then enter downtime and the process may proceed to set all tablespaces to read only (so that no update to the datafiles of the source database system can proceed) (521). Thereafter, the process may perform a delta consistent backup with table space metadata (522). Then, the process may recover datafiles on the target database system, for example, in accordance with the metadata (523). The process may then import tablespace metadata (524), restore users, roles, privileges, and assignments (525), and transfer database metadata using datadump (526). Next, the process may set tablespace to read/write (527). The implementations may particularly back up all the database users, roles, privileges, and their assignments and restore these in the target database to maintain system integrity. In other words, such extended back up may include querying tables/views from the source database, based on certain conditions and relations between these tables/views, and then extracting the information in a format that is ready to be imported into the target database during the migration. In an example, Oracle/SAP transportable tablespace (TTS) procedures do not provide a tool to extract users and their assignment separately as is required for this migration. Hence, such packages can only move tablespace, without the database users and privileges and roles that are residing in the system tablespace.

Thereafter, the implementations may transfer missing non-table/index objects (529) and create row count tables on source database system and target database system and compare results to enforce an integrity check (530). In particular, the transfer of non-table/index objects include the migration of non-table/index database objects, such as sequences and procedures. Such non-table/index database objects may not be included in, for example, the Oracle/SAP TTS migration method.

Thereafter, the target database system may enter uptime (531) and the target database may go live (532). The process may further move table statistics migration to the target system (533) and import unused tables/indices (534). Database table statistics can provide visibility to a database optimizer process to reveal profiled performance information, and hence can be helpful to tuning the performance of database. However, since data pump is executed during downtime, moving statistics along with metadata will only prolong the downtime. If the table statistics is recreated after the target database system goes live, system performance can be negatively impacted because the statistics recreation can take very long time. In order to further reduce downtime without affecting performance during the going live phase, the statistics are exported and imported during uptime phases instead of using data pump during downtime. The exporting/importing process may only takes a few minutes.

FIG. 5B illustrates an example of a flow-chart 550 according to an implementation of the present disclosure. For migration from a source database system to a target database system, one or more increments between a back-up copy of the source database system and the source database system itself are identified (552). Here, the source database system and the target database system have large datafiles, for example, 1 TB or even larger. In other words, these database systems are not tailored to average-sized transactions such as for example, those used in e-commerce systems. The source database system, for example, can include one or more datafiles encoding data objects, and tablespaces encoding table and index data. The back-up copy includes: at least the one or more datafiles encoding the data files.

Next, a restoration is performed during an uptime of the source database system (554) so that datafiles are transferred from the back-up copy of the source database system to the target database system. The restoration can be performed in parallel so that, for example, the one or more datafiles can be split and distributed to a multi-thread execution to leverage resources at the operating system level. This parallelization can improve the throughput and speed of transfer. Moreover, this parallelization is performed during the uptime of the source database system.

During the uptime of the source database system, the process may additionally identify a portion of the tablespace data that is unused by the source database system, and export the portion of the tablespace data that is unused by the source database system. During this uptime, the process may additionally back up user data of the source database system, the user data encoding users, and respective roles, credentials, and assignments of the users. During this uptime, the process may further export a snapshot of database statistics of the source database system.

After entering the downtime of the source database system, the process may sequentially perform, (i) setting the tablespace data to read only; (ii) recovering datafiles on the target database system in accordance with the one or more increments; and (iii) setting the tablespace data to read and write (556). During the downtime of the source database system, the process may further restore the user data of the source database system. During the downtime of the source database system, the process may further transfer one or more non-table/index database objects from the source database system to the target database system. The one or more non-table/index database objects may include at least one of: a sequence, or a procedure of the source database system. During the downtime of the source database system, the process may additionally create a first row count table for the source database system and a second row count table for the target database system; compare the first row count table and the second row count table; and determine an integrity of migrating the source database system to the target database system.

After the successful migration, the process may activate the target database system to go live (558). The process may import, to the target database system and after the target database system has gone live, the portion of the tablespace data that is unused by the source database system. The process may further import, to the target database system and after the target database system has gone live, the snapshot of database statistics of the source database system.

Figure 6:
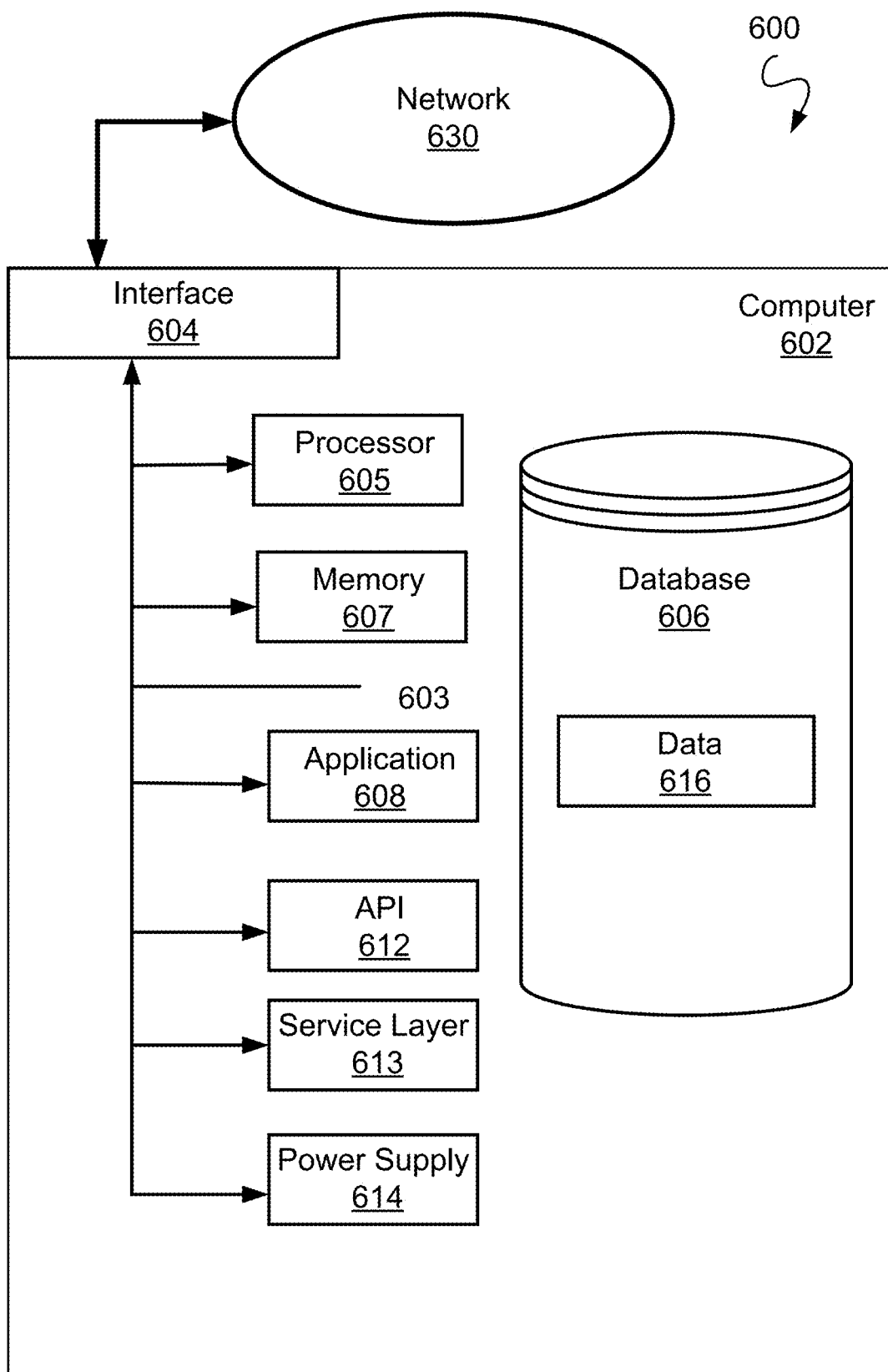
FIG. 6 is a block diagram illustrating an example of a computer system used to provide computational functionalities associated with described algorithms, methods, functions, processes, flows, and procedures, according to an implementation of the present disclosure.

FIG. 6 is a block diagram illustrating an example of a computer system 600 used to provide computational functionalities associated with described algorithms, methods, functions, processes, flows, and procedures, according to an implementation of the present disclosure. The illustrated computer 602 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 602 can comprise a computer that includes an input device, such as a keypad, keyboard, touch screen, another input device, or a combination of input devices that can accept user information, and an output device that conveys information associated with the operation of the computer 602, including digital data, visual, audio, another type of information, or a combination of types of information, on a graphical-type user interface (UI) (or GUI) or other UI.

The computer 602 can serve in a role in a computer system as a client, network component, a server, a database or another persistency, another role, or a combination of roles for performing the subject matter described in the present disclosure. The illustrated computer 602 is communicably coupled with a network 630. In some implementations, one or more components of the computer 602 can be configured to operate within an environment, including cloud-computing-based, local, global, another environment, or a combination of environments.

The computer 602 is an electronic computing device operable to receive, transmit, process, store, or manage data and information associated with the described subject matter. According to some implementations, the computer 602 can also include or be communicably coupled with a server, including an application server, e-mail server, web server, caching server, streaming data server, another server, or a combination of servers.

The computer 602 can receive requests over network 630 (for example, from a client software application executing on another computer 602) and respond to the received requests by processing the received requests using a software application or a combination of software applications. In addition, requests can also be sent to the computer 602 from internal users, external or third-parties, or other entities, individuals, systems, or computers.

Each of the components of the computer 602 can communicate using a system bus 603. In some implementations, any or all of the components of the computer 602, including hardware, software, or a combination of hardware and software, can interface over the system bus 603 using an application programming interface (API) 612, a service layer 613, or a combination of the API 612 and service layer 613. The API 612 can include specifications for routines, data structures, and object classes. The API 612 can be either computer-language independent or dependent and refer to a complete interface, a single function, or even a set of APIs.

The service layer 613 provides software services to the computer 602 or other components (whether illustrated or not) that are communicably coupled to the computer 602. The functionality of the computer 602 can be accessible for all service consumers using this service layer. Software services, such as those provided by the service layer 613, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 602, alternative implementations can illustrate the API 612 or the service layer 613 as stand-alone components in relation to other components of the computer 602 or other components (whether illustrated or not) that are communicably coupled to the computer 602. Moreover, any or all parts of the API 612 or the service layer 613 can be implemented as a child or a sub-module of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602. The interface 604 is used by the computer 602 for communicating with another computing system (whether illustrated or not) that is communicatively linked to the network 630 in a distributed environment. Generally, the interface 604 is operable to communicate with the network 630 and comprises logic encoded in software, hardware, or a combination of software and hardware. More specifically, the interface 604 can comprise software supporting one or more communication protocols associated with communications such that the network 630 or interface's hardware is operable to communicate physical signals within and outside of the illustrated computer 602.

The computer 602 includes a processor 605. Although illustrated as a single processor 605 in FIG. 6, two or more processors can be used according to particular needs, desires, or particular implementations of the computer 602. Generally, the processor 605 executes instructions and manipulates data to perform the operations of the computer 602 and any algorithms, methods, functions, processes, flows, and procedures as described in the present disclosure.

The computer 602 also includes a database 606 that can hold data for the computer 602, another component communicatively linked to the network 630 (whether illustrated or not), or a combination of the computer 602 and another component. For example, database 606 can be an in-memory, conventional, or another type of database storing data consistent with the present disclosure. In some implementations, database 606 can be a combination of two or more different database types (for example, a hybrid in-memory and conventional database) according to particular needs, desires, or particular implementations of the computer 602 and the described functionality. Although illustrated as a single database 606 in FIG. 6, two or more databases of similar or differing types can be used according to particular needs, desires, or particular implementations of the computer 602 and the described functionality. While database 606 is illustrated as an integral component of the computer 602, in alternative implementations, database 606 can be external to the computer 602. As illustrated, data 616 on the database 606 may encompass either a source database system (e.g., source database system 101) or a target database system (e.g., target database system 110).

The computer 602 also includes a memory 607 that can hold data for the computer 602, another component or components communicatively linked to the network 630 (whether illustrated or not), or a combination of the computer 602 and another component. Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 or similar or differing types can be used according to particular needs, desires, or particular implementations of the computer 602 and the described functionality. While memory 607 is illustrated as an integral component of the computer 602, in alternative implementations, memory 607 can be external to the computer 602.

The application 608 is an algorithmic software engine providing functionality according to particular needs, desires, or particular implementations of the computer 602, particularly with respect to functionality described in the present disclosure. For example, application 608 can serve as one or more components, modules, or applications. Further, although illustrated as a single application 608, the application 608 can be implemented as multiple applications 608 on the computer 602. In addition, although illustrated as integral to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion or management circuits (including recharging, standby, or another power management functionality). In some implementations, the power-supply 614 can include a power plug to allow the computer 602 to be plugged into a wall socket or another power source to, for example, power the computer 602 or recharge a rechargeable battery.

There can be any number of computers 602 associated with, or external to, a computer system containing computer 602, each computer 602 communicating over network 630. Further, the term "client," "user," or other appropriate terminology can be used interchangeably, as appropriate, without departing from the scope of the present disclosure. Moreover, the present disclosure contemplates that many users can use one computer 602, or that one user can use multiple computers 602.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of media and memory devices, magnetic devices, magneto optical disks, and optical memory device. Memory devices include semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Magnetic devices include, for example, tape, cartridges, cassettes, internal/removable disks. Optical memory devices include, for example, digital video disc (DVD), CD-ROM, DVD+/– R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback. Input from the user can be received in any form, including acoustic, speech, or tactile input. In addition, a computer can interact with the user by sending documents to and receiving documents from a client computing device that is used by the user.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between networks addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method for database migration, comprising:
    identifying, during an uptime of a source database system, one or more increments between a back-up copy of the source database system and the source database system, wherein:
        the source database system comprises: one or more datafiles encoding data objects, and tablespace data encoding table and index data, and
        the back-up copy of the source database system comprises: the one or more datafiles encoding data objects;
    backing up, into the back-up copy and during the uptime of the source database system, user data of the source database system, the user data encoding users, and respective roles, credentials, and assignments of the users;
    restoring, in parallel and during the uptime of the source database system, the one or more datafiles from the back-up copy to a target database system, the target database system using an endian format different from the source database system;

sequentially performing, during a downtime of the source database system,
(i) setting the tablespace data to read only;
(ii) recovering datafiles on the target database system in accordance with the one or more increments;
(iii) setting the tablespace data to read and write; and
subsequently activating the target database system to go live while starting to restore the user data of the source database system,
wherein a gap exists between when the source database system enters the downtime and when the target database system is activated, and
wherein the gap is limited to a duration of said recovering data files on the target database system in accordance with the one or more increments.

2. The computer-implemented method of claim 1, further comprising:
identifying, during the uptime of the source database system, a portion of the tablespace data that is unused by the source database system, wherein a portion of the tablespace data is unused when non-temporary tables and indices encoded by the portion contain zero records; and
exporting, during the uptime of the source database system, the portion of the tablespace data that is unused by the source database system.

3. The computer-implemented method of claim 2, further comprising:
importing, to the target database system and after the target database system has gone live, the portion of the tablespace data that is unused by the source database system.

4. The computer-implemented method of claim 1, further comprising:
transferring, during the downtime of the source database system, one or more non-table/index database objects from the source database system to the target database system.

5. The computer-implemented method of claim 4, wherein the one or more non-table/index database objects comprises at least one of: a sequence, or a procedure of the source database system.

6. The computer-implemented method of claim 1, further comprising:
exporting a snapshot of database statistics of the source database system during the uptime of the source database system.

7. The computer-implemented method of claim 6, further comprising:
importing, to the target database system and after the target database system has gone live, the snapshot of database statistics of the source database system.

8. A computer system for data migration from a source database system to a target database system, the computer system comprising one or more processors configured to perform operations of:
identifying, during an uptime of a source database system, one or more increments between a back-up copy of the source database system and the source database system, wherein:
the source database system comprises: one or more datafiles encoding data objects, and tablespace data encoding table and index data, and
the back-up copy of the source database system comprises: the one or more datafiles encoding data objects;
backing up, into the back-up copy and during the uptime of the source database system, user data of the source database system, the user data encoding users, and respective roles, credentials, and assignments of the users;
restoring, in parallel and during the uptime of the source database system, the one or more datafiles from the back-up copy to a target database system, the target database system using an endian format different from the source database system;
sequentially performing, during a downtime of the source database system,
(i) setting the tablespace data to read only;
(ii) recovering datafiles on the target database system in accordance with the one or more increments;
(iii) setting the tablespace data to read and write; and
subsequently activating the target database system to go live while starting to restore the user data of the source database system,
wherein a gap exists between when the source database system enters the downtime and when the target database system is activated, and
wherein the gap is limited to a duration of said recovering data files on the target database system in accordance with the one or more increments.

9. The computer system of claim 8, wherein operations further comprise:
identifying, during the uptime of the source database system, a portion of the tablespace data that is unused by the source database system, wherein a portion of the tablespace data is unused when non-temporary tables and indices encoded by the portion contain zero records; and
exporting, during the uptime of the source database system, the portion of the tablespace data that is unused by the source database system.

10. The computer system of claim 9, wherein the operations further comprise:
importing, to the target database system and after the target database system has gone live, the portion of the tablespace data that is unused by the source database system.

11. The computer system of claim 8, wherein the operations further comprise:
transferring, during the downtime of the source database system, one or more non-table/index database objects from the source database system to the target database system.

12. The computer system of claim 11, wherein the one or more non-table/index database objects comprises at least one of: a sequence, or a procedure of the source database system.

13. The computer system of claim 8, wherein the operations further comprise:
exporting a snapshot of database statistics of the source database system during the uptime of the source database system.

14. The computer system of claim 13, wherein the operations further comprise:
importing, to the target database system and after the target database system has gone live, the snapshot of database statistics of the source database system.

* * * * *